(12) United States Patent
Malischewski et al.

(10) Patent No.: US 11,572,812 B2
(45) Date of Patent: Feb. 7, 2023

(54) DEVICE FOR LUBRICATING AN INTERNAL COMBUSTION ENGINE

(71) Applicant: MAN Truck & Bus AG, Munich (DE)

(72) Inventors: Thomas Malischewski, Heilsbronn (DE); Dominik Renner, Ansbach (DE)

(73) Assignee: MAN TRUCK & BUS AG, Munich (DE)

( * ) Notice: Subject to any disclaimer, the term of this patent is extended or adjusted under 35 U.S.C. 154(b) by 574 days.

(21) Appl. No.: 16/052,389

(22) Filed: Aug. 1, 2018

(65) Prior Publication Data

US 2019/0040773 A1  Feb. 7, 2019

(30) Foreign Application Priority Data

Aug. 2, 2017  (DE) .............................. 102017117516

(51) Int. Cl.
*F01M 1/16* (2006.01)
*F01M 1/02* (2006.01)
(Continued)

(52) U.S. Cl.
CPC ................ *F01M 1/16* (2013.01); *F01M 1/02* (2013.01); *F01M 1/06* (2013.01); *F01M 11/02* (2013.01);
(Continued)

(58) Field of Classification Search
CPC . F01M 11/02; F01M 1/02; F01M 1/06; F01M 1/16; F01M 2001/062;
(Continued)

(56) References Cited

U.S. PATENT DOCUMENTS 2,456,668 A * 12/1948 Anderson ................. F01P 3/10
123/41.38
3,033,313 A   5/1962 Prince
(Continued)

FOREIGN PATENT DOCUMENTS

CN       105593478 A      5/2016
DE   102007058756 A1 *   9/2008  ............... F01M 1/16
(Continued)

OTHER PUBLICATIONS

Machine Translation of DE102007058756A1 PDF file name: "DE102007058756A1_Machine_Translation.pdf".*
(Continued)

*Primary Examiner* — Grant Moubry
*Assistant Examiner* — Ruben Picon-Feliciano
(74) *Attorney, Agent, or Firm* — Weber Rosselli & Cannon LLP

(57) ABSTRACT

The present disclosure relates to a device for lubricating an internal combustion engine having a crankshaft, which is connected to at least one connecting rod. The device has at least one first flow limiter, in particular a restrictor, for reducing a lubricating fluid flow of a lubricating fluid stream passed to the at least one first flow limiter. The device has a plurality of crankshaft bearings for the rotatable support of the crankshaft, wherein the plurality of crankshaft bearings is provided in fluid communication downstream of the at least one first flow limiter. The device has at least one big end bearing for the rotatable support of the at least one connecting rod, wherein the at least one big end bearing is provided in fluid communication downstream of at least one crankshaft bearing of the plurality of crankshaft bearings.

17 Claims, 2 Drawing Sheets

(51) Int. Cl.
*F16N 27/00* (2006.01)
*F01M 11/02* (2006.01)
*F01M 1/06* (2006.01)

(52) U.S. Cl.
CPC ..... *F16N 27/005* (2013.01); *F01M 2001/062* (2013.01); *F01M 2011/026* (2013.01); *F16N 2270/22* (2013.01); *F16N 2270/60* (2013.01)

(58) Field of Classification Search
CPC ....... F01M 2011/026; F01M 2001/066; F01M 1/08; F01M 2011/027; F16N 2270/22; F16N 2270/60; F16N 27/005; F16C 3/14; F16C 3/16
See application file for complete search history.

(56) References Cited

U.S. PATENT DOCUMENTS

| | | | | |
|---|---|---|---|---|
| 3,033,314 | A * | 5/1962 | Wetterhahn | F01M 1/06 184/6.9 |
| 3,352,290 | A * | 11/1967 | Kuroda | F01C 21/04 418/60 |
| 3,739,657 | A | 6/1973 | Patchen et al. | |
| 3,842,938 | A * | 10/1974 | Barnes-Moss | F01M 1/06 184/6.5 |
| 4,023,547 | A * | 5/1977 | Reisacher | F01M 1/06 123/196 R |
| 4,398,507 | A * | 8/1983 | Belsanti | F01P 3/06 123/41.38 |
| 4,567,815 | A * | 2/1986 | Kocher | F01M 1/06 384/291 |
| 4,928,550 | A * | 5/1990 | Sakai | F16C 3/14 74/595 |
| 5,046,930 | A * | 9/1991 | Lindstrom | F04B 39/0246 184/6.18 |
| 5,138,991 | A * | 8/1992 | Wojdyla | F01M 1/06 123/196 R |
| 5,146,879 | A * | 9/1992 | Kume | F01M 1/06 123/48 B |
| 5,152,373 | A * | 10/1992 | Callies | F01M 1/06 123/196 R |
| 5,517,959 | A | 5/1996 | Kato et al. | |
| 5,533,472 | A * | 7/1996 | Sands | F01P 3/08 123/41.35 |
| 8,307,804 | B2 * | 11/2012 | Ohta | F01M 1/06 123/196 R |
| 2004/0163614 | A1 * | 8/2004 | Hiyoshi | F02B 75/045 123/48 B |
| 2005/0076858 | A1 * | 4/2005 | Beardmore | F01M 1/06 123/41.38 |
| 2005/0284424 | A1 * | 12/2005 | Jones | F01P 3/10 123/41.38 |
| 2008/0271597 | A1 * | 11/2008 | Soul | F01M 1/06 92/181 R |
| 2011/0168125 | A1 * | 7/2011 | Momosaki | F01M 1/02 123/196 R |
| 2015/0233279 | A1 * | 8/2015 | Derbin | F01P 7/14 123/41.08 |
| 2015/0275960 | A1 * | 10/2015 | Kamiya | F16C 3/08 74/596 |
| 2016/0305363 | A1 * | 10/2016 | Leone | F02F 1/18 |

FOREIGN PATENT DOCUMENTS

| | | |
|---|---|---|
| DE | 102007058756 A1 | 9/2008 |
| DE | 102014105236 A1 | 10/2015 |
| DE | 102015110742 A1 | 1/2017 |
| EP | 0569790 A1 | 11/1993 |
| JP | S59147811 A | 8/1984 |
| JP | 2007292015 A | 11/2007 |
| JP | 4526325 B2 | 8/2010 |
| JP | 2012117456 A | 6/2012 |
| JP | 2013130161 A | 7/2013 |
| RU | 2582731 C2 | 4/2016 |
| WO | 2016039078 A1 | 3/2016 |

OTHER PUBLICATIONS

First Office Action including search report issued in Chinese Office Action Patent Application No. 201810870364.3 dated Jun. 25, 2021, with English translation, 21 pages.
Decision to Grant issued in Russian Patent Application No. 2018128189/12(045094) dated May 12, 2022. English translation not available.
Brazilian Office Action issued in Brazilian Application No. BR 1020180154605 dated Sep. 20, 2022 with English translation.
Notification of Reason for Rejection issued in Japanese Patent Application No. 2018-145557 dated Sep. 6, 2022 with English translation.

* cited by examiner

DEVICE FOR LUBRICATING AN INTERNAL COMBUSTION ENGINE

BACKGROUND

The present disclosure relates to a device for lubricating an internal combustion engine, in particular for lubricating crankshaft bearings and big end bearings of an internal combustion engine.

A lubricant circuit of an internal combustion engine is known from DE 10 2007 058 756 A1, for example. Here it is envisaged that at least one first adjusting means, by means of which the volume of lubricant delivered to a first oil dispensing member via the first oil channel can be influenced, is provided in a first oil channel.

DE 10 2014 105 236 A1 discloses a lubricating device for supplying lubricant to bearing locations within a crankcase of an internal combustion engine. The lubricating device has a distribution channel having at least one valve inlet for lubricant and at least one feed channel for each bearing location to be supplied, which branches off from the distribution channel and has at least one feed outlet.

In current engines, about 25-35% of the volume of lubricating fluid is passed to the crankshaft bearings and big end bearings at the crankshaft. The flow through the bearings depends on the clearance tolerance, diameter, bearing width, lubricating fluid pressure and lubricating fluid temperature. The diameter and bearing width are generally predetermined for reasons connected with installation space and strength and cannot be changed. At low lubricating fluid temperatures, the flow through the bearings can be reduced. However, this is contrary to the desired minimization of friction in the internal combustion engine, which decreases with increasing oil temperature. As the lubricating fluid pressure rises, the flow through the bearings also rises. This relationship is virtually linear.

SUMMARY

It is the underlying object of the present disclosure to provide an improved device for lubricating an internal combustion engine which, in particular, requires less lubricating fluid, thus making it possible, for example, to use a lubricating fluid pump of smaller design.

The device is suitable for lubricating an internal combustion engine having a crankshaft, which is connected to at least one connecting rod. The device has at least one first flow limiter, in particular a restrictor, for reducing a lubricating fluid flow of a lubricating fluid stream passed to the at least one first flow limiter. The device has a plurality of crankshaft bearings for the rotatable support of the crankshaft. The plurality of crankshaft bearings is provided in fluid communication downstream of the at least one first flow limiter. The device has at least one big end bearing for the rotatable support of the at least one connecting rod. The at least one big end bearing is provided in fluid communication downstream of at least one crankshaft bearing of the plurality of crankshaft bearings.

The at least one first flow limiter selectively reduces the volume of lubricating fluid which is passed to the crankshaft bearings and the at least one big end bearing. In the bearings, the lubricating fluid performs two main tasks. On the one hand, lubricating fluid ensures purely hydrodynamic friction and, on the other hand, the lubricating fluid dissipates heat which has formed owing to the bearing friction. It has been recognized that the thickness of the hydrodynamic clearance film is not a function of the oil pressure. Instead, the thickness of the lubricating film depends decisively on the viscosity of the lubricating fluid and the surface pressure in the bearing. Thus, even low bearing flows are sufficient to dissipate the heat originating from the bearing friction, e.g. up to about 2 kg/min. in the case of a commercial vehicle. The selective reduction of the volume of lubricating fluid by the at least one first flow limiter thus impairs neither the provision of the purely hydrodynamic friction nor heat dissipation. The selective reduction of the volume of lubricating fluid/lubricating fluid pressure makes it possible to reduce the overall lubricating fluid flow rate required to lubricate the internal combustion engine. It is thus possible to use a lubricating fluid pump of smaller design and to reduce a driving power for the lubricating fluid pump, for example.

In particular, the crankshaft bearings can be arranged on crankshaft bearing journals of the crankshaft and the at least one big end bearing can be arranged on at least one big end bearing journal of the crankshaft.

In one illustrative embodiment, the device has a lubricating fluid distribution channel, which is provided in fluid communication upstream of the plurality of crankshaft bearings. In particular, the lubricating fluid distribution channel can be designed as a crankshaft bearing gallery. In addition, the device can have a plurality of lubricating fluid feed channels, which are each provided in fluid communication downstream of the lubricating fluid distribution channel and upstream of a crankshaft bearing of the plurality of crankshaft bearings. Via the lubricating fluid distribution channel and the lubricating fluid feed channels, lubricating fluid can be fed to the crankshaft bearings from the first flow limiter.

In a development, the at least one first flow limiter is provided in fluid communication upstream of the lubricating fluid distribution channel and/or in the lubricating fluid distribution channel. In an embodiment of this kind, there is the possibility, in particular, that only a single flow limiter will be required, reducing the volume of lubricating fluid for all the crankshaft bearings and big end bearings by virtue of its arrangement.

In particular, the at least one first flow limiter can be integrated into a crankshaft bearing gallery.

In another illustrative embodiment, one first flow limiter is arranged in each of the plurality of lubricating fluid feed channels. Thus, one flow limiter is required for each lubricating fluid feed channel. This can be advantageous, for example, for reasons of improved access during servicing of the internal combustion engine.

In one embodiment, the at least one big end bearing is provided in substantially continuous fluid communication with the at least one first flow limiter via the at least one crankshaft bearing of the plurality of crankshaft bearings, irrespective of a rotational position of the crankshaft. It is thereby possible to ensure adequate lubrication of the big end bearings, even at low lubricating fluid flow rates. The problem of a discontinuous supply of pressurized lubricating fluid at high engine speeds lies in the cavitation in the connecting rod bearing bore. Here, the lubricating fluid may evaporate due to the centrifugal force. The bubbles of vapour which form implode slowly and ensure that the flow of lubricating fluid to the big end bearings is considerably restricted. With continuous fluid communication, the risk of cavitation can be considerably reduced.

In another embodiment, lubricating fluid channels, in particular lubricating fluid holes, in the crankshaft and lubricating fluid bearing grooves in bearing shells of the plurality of crankshaft bearings are designed in such a way that the substantially continuous fluid communication with the at least one big end bearing is provided.

In a further embodiment, the at least one big end bearing is provided in fluid communication with the at least one crankshaft bearing of the plurality of crankshaft bearings via at least one crankshaft lubricating fluid channel provided in the crankshaft. For example, the crankshaft lubricating fluid channel can comprise a plurality of interconnected holes in the crankshaft.

In yet another embodiment, the at least one crankshaft lubricating fluid channel has at least two mutually spaced inlet openings, which open into an outer circumferential surface of a crankshaft bearing journal of the crankshaft. In contrast, known crankshaft lubricating fluid channels have just a single hole (blind hole) in the region of the crankshaft bearing journal, and, depending on a rotational position of the crankshaft, this does not allow continuous fluid communication with the big end bearings.

In particular, the inlet openings can be arranged in such a way that substantially continuous fluid communication with the at least one big end bearing is obtained, in particular in combination with formation of a lubricating fluid bearing groove of a crankshaft bearing.

In a further embodiment, the at least one crankshaft bearing fluid channel has a through hole in a crankshaft bearing journal. The through hole can extend substantially perpendicularly to a longitudinal axis of the crankshaft, for example. The through hole is easy to produce and leads to the formation of two inlet openings for the crankshaft lubricating fluid channel, thus allowing continuous fluid communication with the at least one big end bearing.

In one embodiment, each of the plurality of crankshaft bearings has a lubricating fluid bearing groove which extends over an angular range of at least 180°. In combination with correspondingly arranged inlet openings of the crankshaft lubricating fluid channel in fluid communication with the big end bearings, it is thereby possible to enable continuous fluid communication.

In another embodiment, the device furthermore has at least one small end bearing, which is provided in fluid communication, in particular via a connecting rod longitudinal channel (e.g. a connecting rod longitudinal hole), downstream of a big end bearing of the at least one big end bearing.

The at least one small end bearing can be designed as a plain bearing.

The at least one small end bearing can support a piston of the internal combustion engine rotatably on the connecting rod, e.g. via a piston pin.

In another embodiment, the device furthermore has at least one wheel train bearing for the rotatable support of a wheel of a wheel train of the internal combustion engine, wherein, in particular, the at least one wheel train bearing is provided in fluid communication downstream of the lubricating fluid distribution channel and/or the at least one first flow limiter. The device can thus also be used to lubricate (gear)wheels of components of the wheel train bearing, e.g. a bearing of a cam shaft drive, a bearing of a PTO (power takeoff), a bearing of a high-pressure pump and a bearing of a fan gearwheel.

In another embodiment, the device furthermore has a plurality of camshaft bearings for the rotatable support of a camshaft, a plurality of cam follower bearings for the rotatable support of cam followers, a plurality of ball-joint feet on rocker arms of the internal combustion engine and/or at least one piston cooling nozzle for spraying lubricating fluid onto at least one piston of the internal combustion engine, which piston is connected to the at least one connecting rod. The lubricating fluid fed to the device can thus be used to lubricate a multiplicity of components of the internal combustion engine.

In particular, the camshaft, rocker arms, cam followers, cam follower bearings and ball-joint feet can be provided in a cylinder head of the internal combustion engine.

In a development, the device has at least one second flow limiter, in particular a restrictor, which is provided in fluid communication upstream of the plurality of crankshaft bearings, of the plurality of cam follower bearings and/or of the plurality of ball-joint feet. It is thereby also possible to set a lubricating fluid flow rate to the camshaft bearings, the cam follower bearings and/or the ball-joint feet to a low value. This can enable a lubricating fluid pump of smaller design and a lower driving power for the lubricating fluid pump.

In particular, the at least one first flow limiter and the at least one second flow limiter can reduce the respectively supplied lubricating fluid stream to different degrees. It is thereby possible selectively to set the required volumes of lubricating fluid for the respective components which are provided downstream of the flow limiters. The selective setting allows further optimization of the overall volume of lubricating fluid required, and therefore a lubricating fluid pump of the device can be of smaller design.

In a further embodiment, the device furthermore has a lubricating fluid pump, which is provided in fluid communication upstream of the at least one first flow limiter. The at least one second flow limiter, the at least one wheel train bearing, the plurality of camshaft bearings, the plurality of cam follower bearings, the plurality of ball-joint feet and/or the at least one piston cooling nozzle can be provided in fluid communication downstream of the lubricating fluid pump.

The at least one first flow limiter and the at least one second flow limiter can be provided in fluid communication downstream of a lubricating fluid pump of the device. A branch, which leads, on the one hand, to the at least one first flow limiter and, on the other hand, to the at least one second flow limiter, can be provided downstream of the lubricating fluid pump.

The device can furthermore have, in particular, a lubricating fluid filter and/or a lubricating fluid cooler, which are provided in fluid communication downstream of the lubricating fluid pump.

It is possible for the lubricating fluid filter and the lubricating fluid cooler to be arranged in series and, in particular, to be provided in fluid communication upstream of the bearings, bearing locations etc. to be lubricated and/or cooled.

It is also possible for the lubricating fluid filter and the lubricating fluid cooler to be provided in parallel with one another downstream of the lubricating fluid pump. After the lubricating fluid pump, the lubricating fluid can be distributed in parallel between the lubricating fluid cooler and the lubricating fluid filter. Downstream of the lubricating fluid filter, the lubricating fluid can be passed to all the lubrication points (bearing, bearing location), for example. Downstream of the lubricating fluid cooler, the lubricating fluid can be passed (exclusively) to the piston cooling nozzles, for example.

The lubricating fluid can be passed to the lubricating fluid pump downstream of the lubrication points (bearings, bearing locations etc.) in order to form a lubricating fluid circuit.

In an illustrative embodiment, the at least one big end bearing and/or the plurality of crankshaft bearings are designed as plain bearings.

According to another aspect, the present disclosure relates to a motor vehicle, in particular a commercial vehicle (e.g. a bus or heavy goods vehicle), having a device for lubricating an internal combustion engine as disclosed herein.

However, it is also possible for the device for lubrication as disclosed herein to be used in internal combustion engines which are not used in motor vehicles, e.g. in stationary internal combustion engines, on ships, in trains etc. The above-described embodiments and features of the present disclosure can be combined in any desired way with one another.

BRIEF DESCRIPTION OF THE DRAWINGS

Further details and advantages of the present disclosure are described below with reference to the attached drawings, in which.

DETAILED DESCRIPTION

The embodiments shown in the figures correspond at least partially, and therefore similar or identical parts are provided with the same reference signs and, to explain them, reference is also made to the description of the other embodiments or figures in order to avoid repetitions.

To improve comprehension, a number of components of an illustrative internal combustion engine are first of all described with reference to FIGS. 1 and 2. These components are supplied with a lubricating fluid by the lubrication device disclosed herein, as described in greater detail with reference to FIG. 3.

Figure 1:
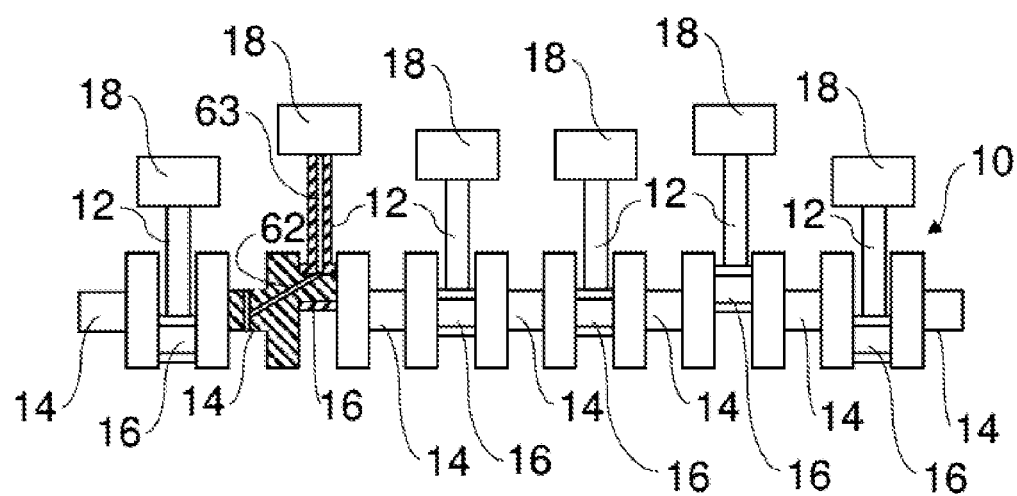
FIG. 1 shows a schematic view of a crankshaft with connected connecting rods.

FIG. 1 shows a crankshaft 10 and connecting rods 12 of an internal combustion engine. The internal combustion engine can be comprised in a commercial vehicle, e.g. a bus or a heavy goods vehicle, for example.

The crankshaft 10 has bearing journals 14 and 16 in alternation. Via the bearing journals 14, the crankshaft 10 is supported rotatably in bearing blocks by means of crankshaft bearings designed as plain bearings. Big ends of the connecting rods 12 are supported rotatably on the bearing journals 16 in big end bearings designed as plain bearings. The connecting rods 12 support pistons 18. The pistons 18 each move backwards and forwards in a cylinder during the operation of the internal combustion engine.

During the operation of the internal combustion engine, the plain bearings at the bearing journals 14 and 16 must be lubricated, for example. In addition, the pistons 18 moving backwards and forwards in the cylinders must be lubricated.

Figure 2:
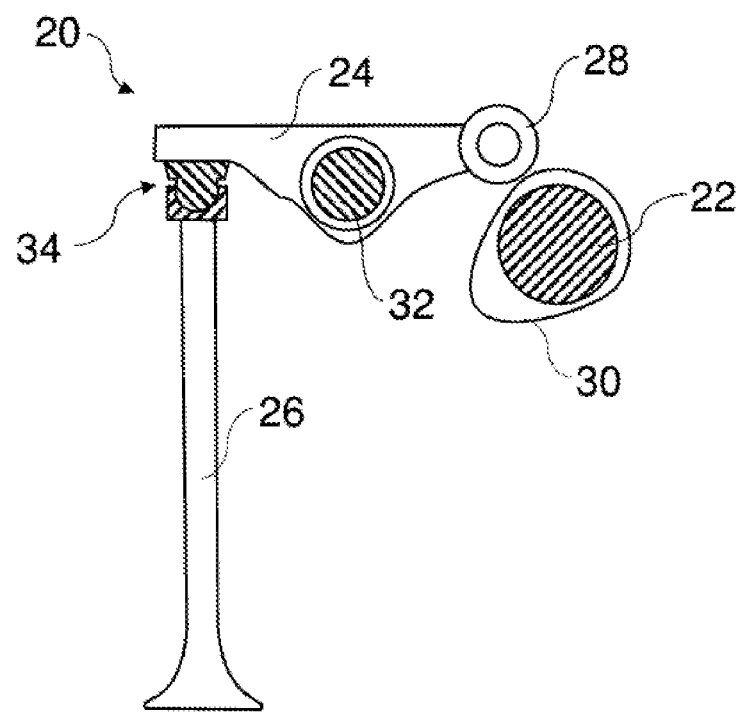
FIG. 2 shows a schematic view of a valve train having a camshaft, a rocker arm and an engine valve.

A valve train 20 is shown in FIG. 2. The valve train 20 has a camshaft 22, a rocker arm 24 and an engine valve 26, e.g. an inlet valve or an outlet valve. For a plurality of cylinders and a plurality of inlet and outlet valves, the internal combustion engine can have a plurality of valve trains 20.

A cam follower 28 of the rocker arm 24 follows a cam contour of a cam 30 of the camshaft 22. The cam follower 28 can be designed as a roller, for example, which is rotatable about a cam follower pivot. The rocker arm 24 is rotatable about a rocker arm pivot 32. Via a ball-joint foot ("elephant's foot") 34, the rocker arm 24 actuates the engine valve 26 when the cam follower 28 comes into contact with a valve lift region of the cam 30.

During the operation of the internal combustion engine, the rotatable cam follower 28 and the ball-joint foot 34 must be lubricated with a lubricating fluid, for example. The lubricating fluid can be fed in via the rocker arm pivot 32 and the lubricating fluid channels in the rocker arm 24, for example.

Figure 3:
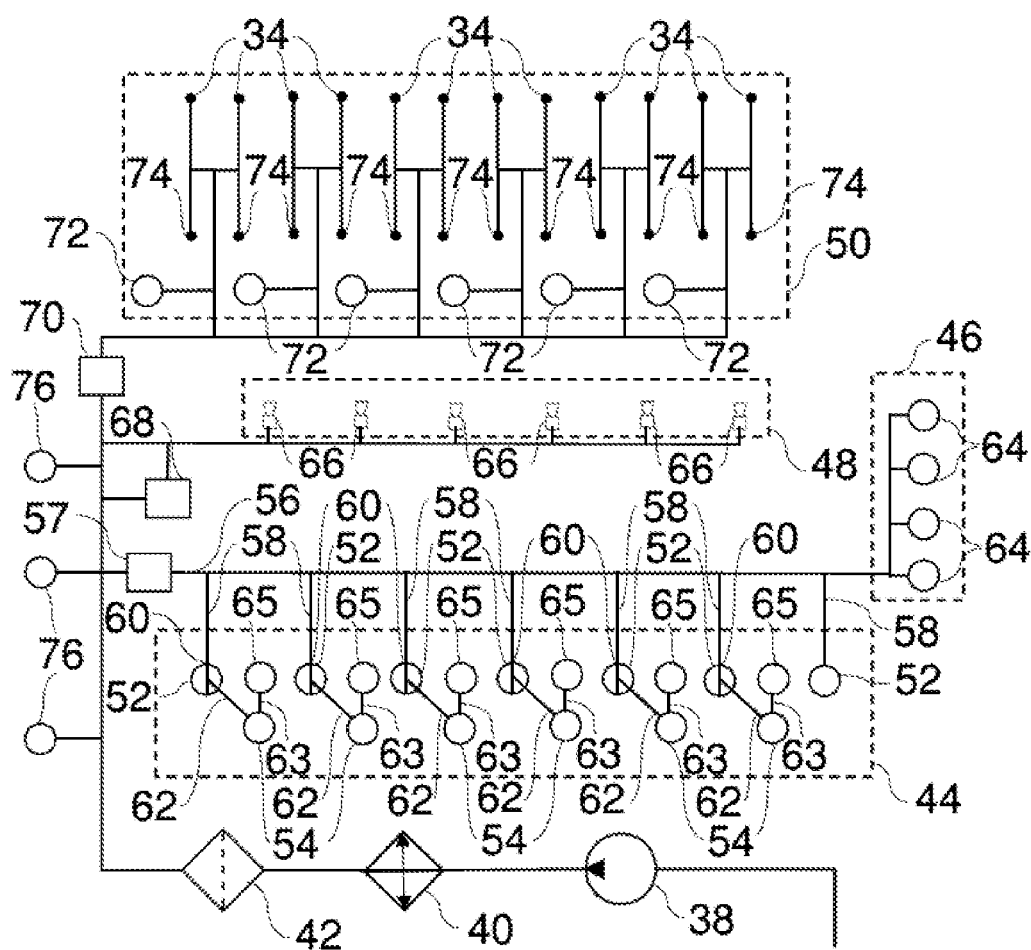
FIG. 3 shows a schematic view of a device for lubricating an internal combustion engine.

FIG. 3 shows a device 36 for lubricating components of the internal combustion engine. The device 36 has a lubricating fluid pump 38, a lubricating fluid cooler 40, a lubricating fluid filter 42 and various regions 44, 46, 48 and 50 to be lubricated.

The lubricating fluid pump 38 draws in a lubricating fluid, e.g. oil. A lubricating fluid stream supplied by the lubricating fluid pump 38 is passed to the lubricating fluid cooler 40 to cool the lubricating fluid. The cooled lubricating fluid stream is passed to the lubricating fluid filter 42. The cooled and filtered lubricating fluid stream is available downstream of the lubricating fluid filter 42 for the lubrication and cooling of components of the internal combustion engine.

The regions 44, 46, 48 and 50 to be lubricated are provided in fluid communication downstream of the lubricating fluid pump 38, the lubricating fluid cooler 40 and the lubricating fluid filter 42.

Region 44 relates to the crankshaft bearings 52 and big end bearings 54 at the crankshaft 10 (see FIG. 1). A lubricating fluid distribution channel 56 distributes the lubricating fluid stream received between a plurality of lubricating fluid feed channels 58 (six in the illustrative embodiments shown). A restrictor 57 is provided upstream of the lubricating fluid distribution channel 56.

By means of the restrictor 57, a lubricating fluid stream to the regions 44 and 46 to be lubricated can be reduced. The reduced lubricating fluid stream makes it possible for more lubricating fluid to be available for the other regions 48, 50 to be lubricated and/or enables the lubricating fluid pump 38 to be made smaller and therefore less expensive. As an alternative or in addition to the restrictor 57, a restrictor can be provided in each lubricating fluid feed channel 58, for example.

The lubricating fluid feed channels 58 carry the lubricating fluid to the crankshaft bearings (main bearings) 52, in which the crankshaft 10 is rotatably supported by means of the bearing journals 14 (see FIG. 1). The big end bearings 54 are provided in fluid communication downstream of the crankshaft bearings 52. The big end bearings 54 support the connecting rod 12 rotatably on the bearing journals 16 of the crankshaft 10 (see FIG. 1).

The lubricating fluid feed channels 58 extend at least partially within bearing blocks for the crankshaft 10 (see FIG. 1) and carry the lubricating fluid stream to the crankshaft bearings 52. Via bearing grooves 60 in the crankshaft bearings 52, the lubricating fluid stream reaches crankshaft lubricating fluid channels 62. In particular, the bearing grooves 60 can be arranged in an upper bearing shell of the crankshaft bearings 52. The crankshaft bearing fluid channels 62 carry the lubricating fluid stream to the big end bearings 54. The crankshaft lubricating fluid channels 62 can extend within the crankshaft 10, in each case from one of the bearing journals 14 to one of the bearing journals 16 (see FIG. 1).

The restrictor 57 brings about a reduced lubricating fluid flow rate to the bearings 52, 54. In order to ensure adequate lubrication of the big end bearings 54, even at the reduced lubricating fluid flow rate, it may be necessary to design the fluid connection to the big end bearings 54 in such a way that a continuous supply of lubricating fluid is made possible. In the illustrative embodiment under consideration, the crankshaft lubricating fluid channels 62 therefore each have two inlet openings in the bearing journal 14 (see FIG. 1). The inlet openings are arranged in such a way that, in combination with a bearing groove 60 of the crankshaft bearings 52 which extends over at least 180°, substantially continuous fluid communication between the lubricating fluid feed channels 58 and the big end bearings 54 via the bearing grooves 60 of the crankshaft bearings 52 and the crankshaft lubricating fluid channels 62 is ensured, irrespective of a rotational position of the crankshaft 10 (see also FIG. 1). A variant for the formation of two inlet openings for each lubricating fluid channel 62, said variant being particularly simple in terms of design, can be made available by providing a through hole in the bearing journal 14 (likewise see FIG. 1). In other embodiments, different designs or methods can also be used to enable substantially continuous fluid communication between the lubricating fluid feed channels 58 and the big end bearings 54.

In some illustrative embodiments, e.g. in the example illustrated in FIGS. 1 and 3, small end bearings 65 can additionally be provided in fluid communication downstream of the big end bearings 54. The fluid communication can be established via a connecting rod longitudinal channel 63, e.g. a bored connecting rod longitudinal channel, in the connecting rod 18. Via the small end bearings 65, the piston 18 can be connected rotatably to the connecting rod 12 by means of a piston pin (not shown).

Downstream of the restrictor 57 and the lubricating fluid distribution channel 56, components of a wheel train of the internal combustion engine which are to be lubricated are grouped together schematically in region 46. The wheel train bearings 64 of the wheel train 46 which are to be lubricated can be a bearing of a camshaft drive, a bearing of a PTO (power take-off), a bearing of a high-pressure pump of the internal combustion engine and a bearing of a fan gearwheel, for example.

The region 48 which is to be lubricated and cooled is provided in fluid communication downstream of the lubricating fluid filter 42, the lubricating fluid cooler 40 and the lubricating fluid pump 38. The region 48 which is to be lubricated and cooled has piston cooling nozzles 66. Via the piston cooling nozzles 66, lubricating fluid is sprayed onto the pistons 18 from below in order to lubricate the reciprocating motion of the piston 18 in the respective cylinder and to cool the pistons 18. For additional cooling, the pistons 18 can be provided with a piston cooling channel (not shown). A lubricating fluid stream to the piston cooling nozzles 66 can be controlled by means of a valve 68.

Region 50 to be lubricated relates to components of a cylinder head of the internal combustion engine which are to be lubricated. The region 50 which is to be lubricated is provided in fluid communication downstream of the lubricating fluid filter 42, the lubricating fluid cooler 40 and the lubricating fluid pump 38. A lubricating fluid stream to region 50 can be set by means of a second restrictor 70. The reduced lubricating fluid stream makes it possible for more lubricating fluid to be made available for the other regions 44, 46, 48 to be lubricated and/or enables the lubricating fluid pump 38 to be made smaller and therefore less expensive.

Within the cylinder head, camshaft bearings 72 of the camshaft 22 (see FIG. 1) are supplied with lubricating fluid. For example, a common camshaft for the inlet valves and the outlet valves of the internal combustion engine can be provided. However, it is also possible for separate camshafts to be provided for the inlet valves and the outlet valves.

In addition, the lubricating fluid is passed to the rocker arms 24, e.g. via the rocker arm pivot 32 (see FIG. 1). The lubricating fluid can be used to lubricate bearings 74 of the cam followers 28 and to lubricate the ball-joint feet 34 of the rocker arms 24 (likewise see FIG. 1).

The device 36 can have a further bearing locations 76 for the lubrication of components of the internal combustion engine. For example, a bearing of a rotary shaft of a turbocharger can be supplied with lubricating fluid.

The present disclosure is not restricted to the illustrative embodiments described above. On the contrary, a large number of variants and modifications is possible that likewise make use of the concept of the present disclosure and therefore fall within the scope of protection.

LIST OF REFERENCE SIGNS 10 crankshaft
12 connecting rod
14 bearing journal
16 bearing journal
18 piston
20 valve train
22 camshaft
24 rocker arm
26 engine valve
28 cam follower
30 cam
32 rocker arm pivot
34 ball-joint foot (elephant's foot)
36 device for lubrication
38 lubricating fluid pump
40 lubricating fluid cooler
42 lubricating fluid filter
44 region to be lubricated (crankshaft bearings and big end bearings)
46 region to be lubricated (wheel train)
48 region to be lubricated (piston cooling nozzles)
50 region to be lubricated (cylinder head)
52 crankshaft bearing (main bearing)
54 big end bearing
56 lubricating fluid distribution channel
57 first restrictor
58 lubricating fluid feed channel
60 bearing groove
62 crankshaft lubricating fluid channel
63 connecting rod longitudinal channel
64 wheel train bearing
65 small end bearing
66 piston cooling nozzle
68 valve
70 second restrictor
72 camshaft bearing
74 cam follower bearing
76 bearing location

We claim:

1. A device for lubricating an internal combustion engine having a crankshaft, which is connected to at least one connecting rod, comprising:
   at least one first flow limiter for reducing a lubricating fluid flow of a lubricating fluid stream passed to the at least one first flow limiter;
   a plurality of crankshaft bearings for the rotatable support of the crankshaft, wherein the plurality of crankshaft bearings is provided in fluid communication downstream of the at least one first flow limiter;

at least one big end bearing for the rotatable support of the at least one connecting rod, wherein the at least one big end bearing is provided in fluid communication downstream of at least one crankshaft bearing of the plurality of crankshaft bearings;

at least one wheel train bearing for the rotatable support of a wheel of a wheel train of the internal combustion engine, wherein the at least one wheel train bearing is provided in fluid communication downstream of the at least one first flow limiter;

wherein the at least one big end bearing is provided in continuous fluid communication with the at least one first flow limiter via the at least one crankshaft bearing of the plurality of crankshaft bearings, irrespective of a rotational position of the crankshaft, and wherein:

the at least one big end bearing is provided in fluid communication with the at least one crankshaft bearing of the plurality of crankshaft bearings via at least one crankshaft lubricating fluid channel provided in the crankshaft; and the at least one crankshaft lubricating fluid channel has at least two mutually spaced inlet openings, which open into an outer circumferential surface of a crankshaft bearing journal of the crankshaft.

2. The device according to claim 1, further comprising:
the lubricating fluid distribution channel is provided in fluid communication upstream of the plurality of crankshaft bearings; and
a plurality of lubricating fluid feed channels, which are each provided in fluid communication downstream of the lubricating fluid distribution channel and upstream of a crankshaft bearing of the plurality of crankshaft bearings.

3. The device according to claim 2, wherein the lubricating fluid distribution channel is a crankshaft bearing gallery.

4. The device according to claim 2, wherein the at least one first flow limiter is provided in fluid communication upstream of the lubricating fluid distribution channel or in the lubricating fluid distribution channel.

5. The device according to claim 2, wherein one first flow limiter is arranged in each of the plurality of lubricating fluid feed channels.

6. The device according to claim 1, wherein lubricating fluid channels in the crankshaft and lubricating fluid bearing grooves in bearing shells of the plurality of crankshaft bearings are designed in such a way that the continuous fluid communication with the at least one big end bearing is provided.

7. The device according to claim 1, wherein:
the at least one crankshaft bearing fluid channel has a through hole in a crankshaft bearing journal; or
the plurality of crankshaft bearings has a lubricating fluid bearing groove which extends over an angular range of at least 180°.

8. The device according to claim 1, further comprising:
at least one small end bearing, which is provided in fluid communication downstream of a big end bearing of the at least one big end bearing.

9. The device according to claim 8, wherein the small end bearing is in fluid communication via a connecting rod longitudinal channel.

10. The device according to claim 1, further comprising:
a plurality of camshaft bearings for the rotatable support of a camshaft; or
a plurality of cam follower bearings for the rotatable support of cam followers; or a plurality of ball-joint feet on rocker arms of the internal combustion engine; or
at least one piston cooling nozzle for spraying lubricating fluid onto at least one piston of the internal combustion engine, which piston is connected to the at least one connecting rod.

11. The device according to claim 10, further comprising:
at least one second flow limiter, which is provided in fluid communication upstream of the plurality of crankshaft bearings, of the plurality of cam follower bearings or of the plurality of ball-joint feet.

12. The device according to claim 11, wherein the at least one first flow limiter or at least one second flow limiter is a restrictor.

13. The device according to claim 10, further comprising:
a lubricating fluid pump, which is provided in fluid communication upstream of the at least one first flow limiter.

14. The device according to claim 13, wherein the at least one second flow limiter, at least one wheel train bearing, the plurality of camshaft bearings, the plurality of cam follower bearings, the plurality of ball-joint feet or the at least one piston cooling nozzle are provided in fluid communication downstream of the lubricating fluid pump.

15. The device according to claim 1, wherein the at least one big end bearing or the plurality of crankshaft bearings are designed as plain bearings.

16. A motor vehicle comprising:
an internal combustion engine having a crankshaft connected to at least one connecting rod; and
a device for lubricating the internal combustion engine, the device including,
at least one first flow limiter for reducing a lubricating fluid flow of a lubricating fluid stream passed to the at least one first flow limiter;
a plurality of crankshaft bearings for the rotatable support of the crankshaft, wherein the plurality of crankshaft bearings is provided in fluid communication downstream of the at least one first flow limiter;
at least one big end bearing for the rotatable support of the at least one connecting rod, wherein the at least one big end bearing is provided in fluid communication downstream of at least one crankshaft bearing of the plurality of crankshaft bearings;
at least one wheel train bearing for the rotatable support of a wheel of a wheel train of the internal combustion engine, wherein the at least one wheel train bearing is provided in fluid communication downstream of the at least one first flow limiter;
wherein the at least one big end bearing is provided in continuous fluid communication with the at least one first flow limiter via the at least one crankshaft bearing of the plurality of crankshaft bearings, irrespective of a rotational position of the crankshaft, and wherein:

the at least one big end bearing is provided in fluid communication with the at least one crankshaft bearing of the plurality of crankshaft bearings via at least one crankshaft lubricating fluid channel provided in the crankshaft; and the at least one crankshaft lubricating fluid channel has at least two mutually spaced inlet openings, which open into an outer circumferential surface of a crankshaft bearing journal of the crankshaft.

17. The motor vehicle of claim 16, wherein the vehicle is a commercial vehicle.

* * * * *